Dec. 19, 1967      R. W. PATTERSON      3,358,518

INTERMITTENT DRIVE MECHANISM

Filed Aug. 2, 1965      2 Sheets-Sheet 1

ROGER W. PATTERSON
INVENTOR.

BY *R. French Smith*

*Paul P. Holmes*
ATTORNEYS

United States Patent Office 3,358,518
Patented Dec. 19, 1967

3,358,518
INTERMITTENT DRIVE MECHANISM
Roger W. Patterson, Washington, D.C., assignor to Eastman Kodak Company, Rochester, N.Y., a corporation of New Jersey
Filed Aug. 2, 1965, Ser. No. 476,450
9 Claims. (Cl. 74—125.5)

ABSTRACT OF THE DISCLOSURE

A device for imparting unidirectional, intermittent motion to an output member from a continuously rotating input member, which device includes an index plate, located adjacent the drive output member, that is cyclically contacted by structure on the output member while the output member is disengaged from drive so as to correct angular position error of the intermittent movement previously transmitted to the output member.

This invention relates to an intermittent drive mechanism and, more particularly, to an improved device for converting unidirectional rotary motion into oscillating or intermittent unidirectional rotary motion.

Intermittent strip feeding devices have heretofore been devised in which continuous motion is converted to intermittent motion to drive a sheet or strip of material. These devices, however, have not always provided the desired precision control of the incremental movements which are imparted to the material. The length of the feeding stroke has been adjusted by replacing or manually adjusting the position of one of the elements in the motion conversion mechanism to vary, for example, the peripheral length of a cam surface, or the length of a piston stroke. These adjustable elements are held in a selected position by pegs, stop members, or by a slide-in-groove member in which the slide is held in the desired position merely by tightening a nut on a bolt. None of these known devices provide means for eliminating angular position error in the intermittently driven output member, such as, for example, a strip driving member. To prevent accumulated position error, the known devices relied on the accuracy of the elements incorporated in the devices or a manual adjustment in such elements.

Devices for converting continuous motion into oscillating rotary motion are often employed to intermittently feed film strip bearing spaced image frames for viewing or for printing purposes. If the length of feed provided by the intermittently driven strip driving member is not accurately controlled, an incomplete portion of a frame may be advanced into the viewing or printing station resulting in frame position error. Furthermore, if no correcting means is provided, the position error may be repeated throughout the entire length of the film strip or the position error may even accumulate and become greater as feed of the film strip continues.

The present invention is directed to an accurately controlled, adjustable device for converting unidirectional rotary motion into oscillating rotary motion and intermittent unidirectional rotary motion, which device provides both a precision adjustment for the amplitude of the oscillating motion and the intermittent rotary motion, and means for eliminating position error in the intermittently driven output member.

In accordance with the present invention, a rotatably driven member is employed for the dual purpose of providing unidirectional rotary motion for conversion to oscillatory and intermittent rotary motion, and for actuating the position error correcting mechanism. A link, connected to the rotatably driven member through a crank arm, imparts oscillating rotary motion to a shaft. The amplitude of the oscillation of the shaft, on which the amplitude of the intermittent rotary motion output depends, is accurately determined by precision adjusting means which controls the length of the crank arm that connects the link to the rotatably driven member.

The output member, to which the intermittent rotary motion is imparted, is mounted to alternately engage an oscillating drive member fixed on the oscillating shaft and the position error correcting mechanism. This alternate engagement is accomplished by mounting the output member so that it engages the oscillating drive member during movement thereof in one direction and is disengaged from the oscillating drive member and moved into engagement with the position error correcting mechanism during the reverse movement of the oscillating drive member. This alternating engagement of the output member is accomplished by a pivotally mounted shift arm operatively connected at one end to the output member and at its other end to a cam surface formed on the periphery of the rotatably driven member.

It is an object of this invention to overcome the disadvantages of known intermittent feed devices by providing an adjustable, precision controlled, intermittent feed device which is particularly useful in feeding sheet and strip material.

It is another object of this invention to provide a position error correcting mechanism for an intermittent unidirectional rotary motion device.

Another object of this invention is to provide a precision adjustment means for accurately determining the amplitude of the output in the output member of an intermittent unidirectional rotary motion device.

It is still another object of this invention to provide a device for converting unidirectional rotary motion to rotary oscillating motion wherein the amplitude of the oscillations is adjustable and precisely controlled.

It is another object of this invention to provide a precision crank arm of accurately adjustable length for use in a motion conversion device.

It is another object of this invention to provide a device for intermittently feeding material in which the output member is moved alternately in a material feeding direction and in a position error correcting direction.

Another object of this invention is to provide a device for controlling the movement of material in which material movement and correction of the accumulated position error of the material is accomplished by means responsive to the angular position of a unidirectional rotating member.

Other objects and advantages of the invention will be apparent during the following description given with relation to the accompanying drawings of which:

Figure 1:
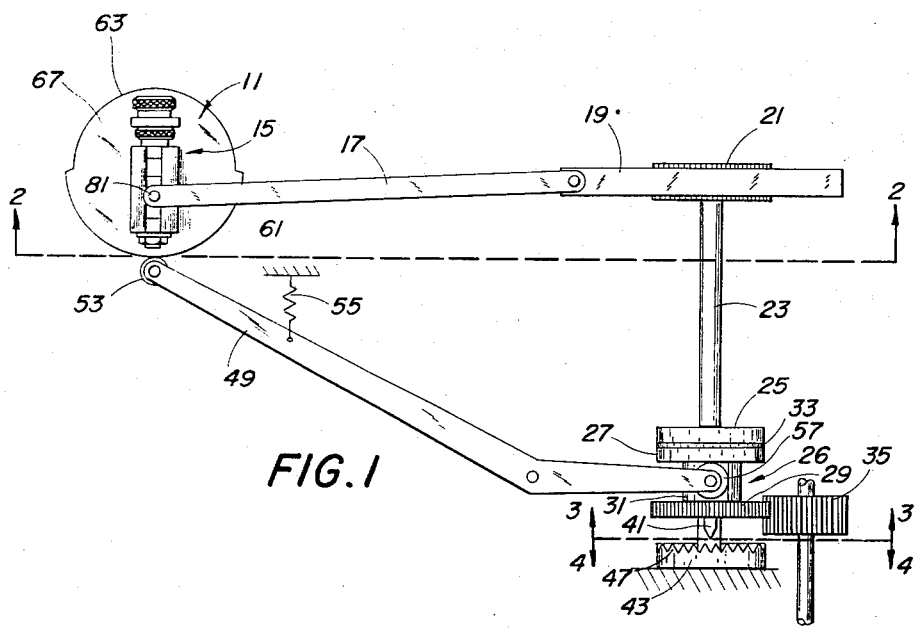
FIG. 1 is a plan view of a typical embodiment of the present invention.
Figure 2:
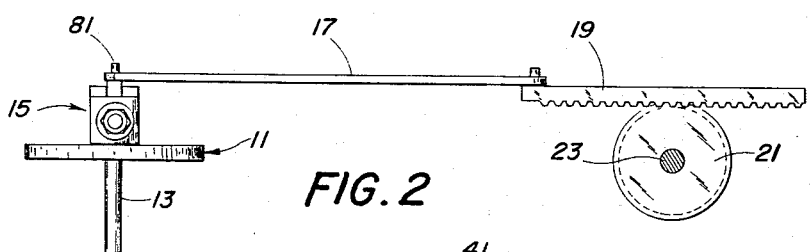
FIG. 2 is a side sectional view of the embodiment shown in FIG. 1, taken along line 2—2 of FIG. 1.
Figure 4:
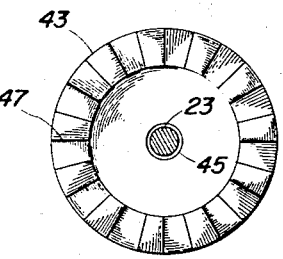
FIG. 4 is an enlarged side sectional view taken along line 4—4 of FIG. 1.
Figure 3:
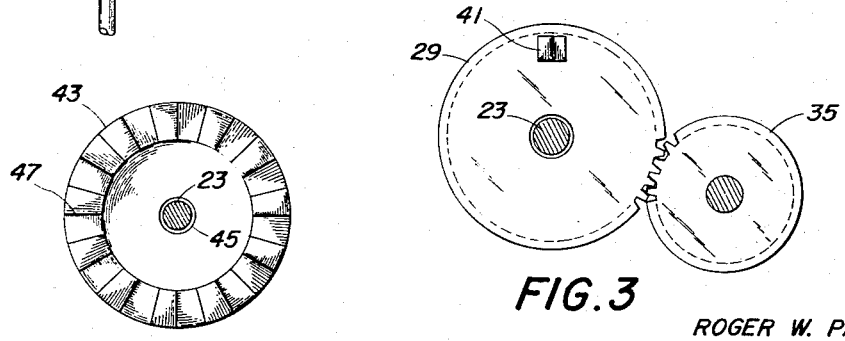
FIG. 3 is an enlarged side sectional view taken along line 3—3 of FIG. 1.

Referring to FIGS. 1 and 2, the rotatable member comprising a cam 11 is mounted for rotation about the axis of shaft 13 which is driven by means such as an electric motor, not shown. The cam 11 carries an adjustable crank arm 15. A link 17 is connected to the crank arm 15 at one end and to a rack 19 at its other end. The rack 19 engages and drives a pinion 21. As is well known, this type of mechanism produces an oscillating, or approximately sinusoidal motion in the pinion, and the amplitude of this motion is determined by the diameter of the pinion and the length of the crank arm. Thus, the amplitude of the oscillations of the pinion can be adjusted by varying the length of the crank arm. Other known mechanisms such as a three bar linkage with one adjustable crank could also be used with essentially the same results. The rack and pinion is preferred in the present embodiment because it permits greater amplitude of oscillation to be obtained.

Pinion 21 is fixed on a shaft 23 as is an oscillating drive member comprising a friction disk 25. The pinion 21 and disk 25 oscillate together about the longitudinal axis of shaft 23. An output member 26 comprising a face plate 27 and a gear 29 rigidly interconnected by a hub 31 of reduced radium are freely mounted on shaft 23 with plate 27 facing the friction surface 33 provided on disk 25. Thus, the output member 26 is free to slide axially along the shaft 23 and it can rotate about shaft 23. Disk 25 and plate 27 form a clutch device and control the rotation of the gear 29, which in turn can be connected through a drive member, such as a gear 35 to directly or indirectly control the feed or movement of material, for example, such as a film strip, not shown, in an apparatus.

A tapered dog 41 is fixed on one side face of the gear 29 and is located to engage an indexing plate 43 which is rigidly mounted opposite gear 29. Indexing plate 43 is coaxial with the gear 29 and has a bore 45 which can be used as a bearing support for shaft 23. Disk 25 and indexing plate 43 are positioned a distance apart sufficient to allow the output member 26 to slide along shaft 23 to selectively engage either disk 25 or indexing plate 43 through dog 41, but not both at the same time. The indexing plate 43 has a series of teeth or serrations 47 which are formed on the side of the plate facing the gear 29. The pitch of the teeth 47 is selected to provide the desired adjustability of output displacement in output member 26 and the desired amplitude of such displacement. When the output member 26 is moved towards the indexing plate 43, the dog 41 engages and bottoms between adjacent teeth 47. Should the output member 26 have rotated slightly more or less than an integral number of teeth, as when a position error occurs, the error will be corrected as the dog 41 bottoms between the adjacent teeth on the indexing plate. Thus a small position error in output member 26, introduced either by lost motion, clutch slippage or faulty setting of the crank arm length, providing such error is less than one half the pitch of the teeth on the indexing plate, will be corrected each time the dog engages the indexing plate. Since the dog 41 is made to engage indexing plate 47 after each cyclic rotation of output member 26, as will be hereinafter more fully explained, the rotary motion of the output member will be free from accumulated position error.

The sliding movement of the output member 26 along shaft 23 between the disk 25 and the indexing plate 43 is accomplished by means of a shift arm 49. The shift arm is mounted for pivotal movement about a pivot 51. A follower roller 53 is mounted for rotation on one end of the shift arm and is resiliently maintained in contact with the periphery of cam 11 by a spring 55. A roller 57 is mounted for rotation on the other end of shift arm 49 and is located adjacent to the hub 31 for engaging plate 27 and gear 29.

It will be apparent from the above description that the axial position and movement of output member 26 on shaft 23 is controlled by the rotating cam 11. When roller 53 is riding on the high portion 61 of cam 11, plate 27 is in engagement with disk 25. When roller 53 is riding on the low portion 63 of the cam, dog 41 is in engagement with indexing plate 43 bottomed between two adjacent teeth thereon. Of course, the dimensions of the various parts are selected to accomplish the described movements and functions.

Figure 5:
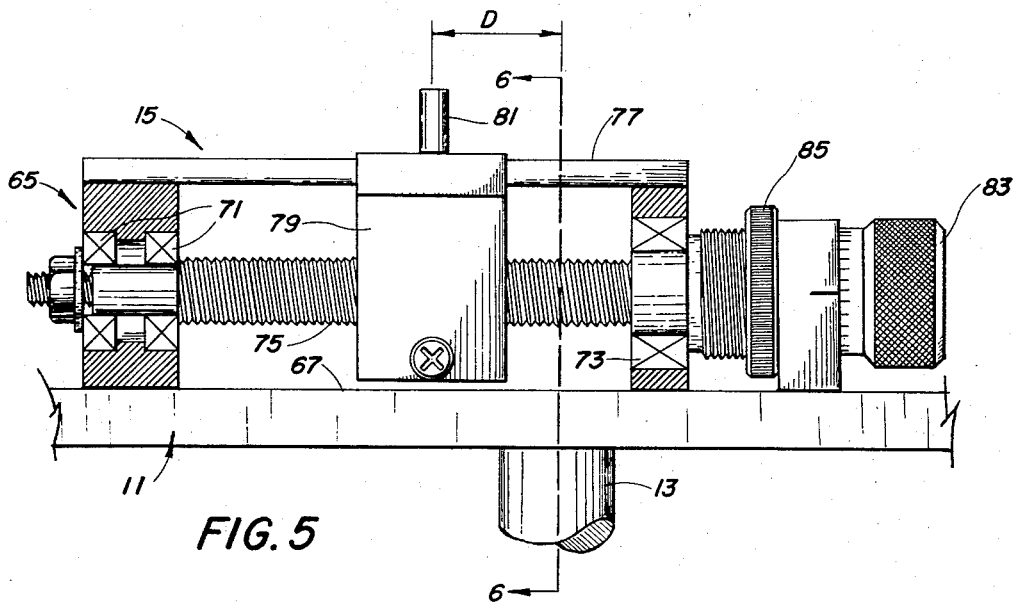
FIG. 5 is an enlarged view partly in section of the adjustable crank arm shown in FIG. 1.
Figure 6:
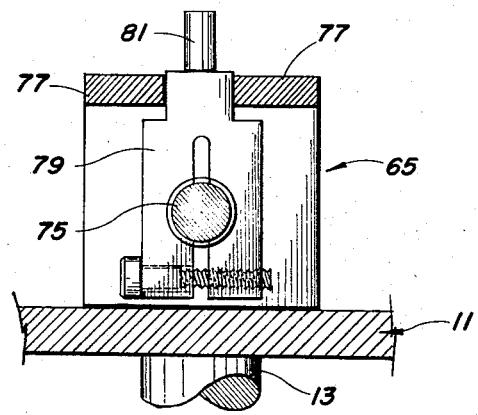
FIG. 6 is a cross-sectional view of the crank arm, taken along line 6—6 of FIG. 5.

The amplitude of the oscillations of the pinion 21, shaft 23 and friction disk 25 is dependent upon the effective length of the crank arm 15. FIGS. 5 and 6 show the precision device employed to accurately adjust and control the effective length of the crank arm. The device comprises a frame 65 which is fixed on the end surface 67 of the rotating member 11. The two ends of the frame incorporate bearings 71 and 73 for receiving a threaded lead screw 75 and are interconnected by a guide member 77. A split nut 79, mounted on the lead screw, is guided by guide member 77 during axial movement relative to the screw 75 as the screw is turned. A crank pin 81 is attached to the split nut 79 and extends through frame 65 for connection to link 17. A calibrated knob 83 is provided for adjusting the set position of split nut 79 relative to screw 75. The distance D between the axis of rotation of the cam 11 and the center of crank pin 81 is the crank arm length. Rotation of the calibrated knob 83 causes this crank arm length to change, changing the amplitude of the oscillations of the pinion 21, the shaft 23 and the friction disk 25. The lead screw setting is held in the selected position by a lock ring 85, the operation of which is well known.

To operate the device, the calibrated knob 83 is first adjusted so that the oscillations of the disk 25 are of the desired amplitude. The cam 11 is then driven at a constant speed. As the cam 11 rotates, the link 17 moves the rack 19 longitudinally which rotates the pinion 21, shaft 23 and disk 25.

In the embodiment illustrated in the drawing, the high portion 61 of cam 11 extends over approximately one half of the periphery of the cam and the low portion 63 extends over the other half. The high portion 61 is bisected by the line of effective operation of crank arm 15. During the half revolution of the cam 11 when the roller 53 rides the high portion 61, the roller 57, at the opposite end of the shift arm 49 urges the plate 27 into frictional engagement with the disk 25. This engagement imparts the rotation of disk 25 to the output member 26. As previously mentioned, the output member 26 may either directly or indirectly control the feed or movement of material such as a film strip. For example, a film driving sprocket, not shown, can be connected either to the shaft of the gear 35 or to the shaft of another gear driven directly or indirectly by gear 35. When the cam 11 rotates to the position where the roller 53 is riding on the low portion 63, the roller 57 urges the output member 26 away from the disk 25 so that the output member 26 is not driven in the reverse direction by disk 25. Instead, dog 41 engages between two adjacent teeth 47 of indexing plate 43, and substantially no rotary motion is imparted to the output member 26. Should the output member 26 have rotated slightly more or less than an integral number of teeth on the indexing plate, however, the angular position error, representing such under or excess motion of the output member, will be corrected as the tapered dog fully engages i.e. bottoms, between the teeth of the indexing plate. Such position error correction results in a very slight angular rotation of the output member 26. As will be recognized, the rotation of cam 11 will produce an intermittent unidirectional rotary movement in the output member 26.

It will now be apparent to those skilled in the art that the apparatus of the present invention provides a reliable device for converting continuous rotary motion into an intermittent unidirectional rotary motion output. Precision mechanisms are provided both to set the arcuate length of the intermittent rotary motion and to eliminate accumulated position error from the output. Accuracy of the generated output movement is thereby assured.

The invention has been described in detail with particular reference to a preferred embodiment thereof, but it will be understood that variations and modifications can be effected within the spirit and scope of the invention as described hereinabove, and as defined in the appended claims.

I claim:

1. In a device having a rotatable input member, a rotatable shaft and an output member mounted on said shaft, the combination comprising:
   (a) means interconnecting said input member and said shaft for converting continuous unidirectional rotation of said input member to an oscillating rotary motion imparted to said shaft;
   (b) means fixed on said shaft for engaging said output member;
   (c) control means operatively associated with said input member for cyclically moving said output member into engagement with said engaging member, said control means including a cam surface on said input member, a pivotally mounted shift arm having one end which follows said cam surface and another end which is operatively associated with said output member to move the same axially along said shaft relative to said drive member, and means for resiliently urging the shift arm toward engagement with said cam surface;
   (d) a toothed indexing plate mounted in a fixed position opposite said output member and coaxially disposed relative thereto; and
   (e) tapered dog means located on the output member facing the indexing plate for engaging the teeth of said indexing plate to position the output member in a predetermined angular relation to the indexing plate,
      whereby the movement imparted to said output member by said shift arm alternately engages the output member with said engaging means and said indexing plate through said dog means so as to cyclically correct angular position error in the output member.

2. The invention in accordance with claim 1 wherein the engaging means frictionally drives the output member for rotational movement.

3. In a device having a rotatable input member, a rotatable output member, and means for converting the continuous, unidirectional rotation of said input member to a unidirectional intermittent rotary motion imparted to said output member, the improvement comprising:
   (a) stationary indexing means mounted adjacent said output member;
   (b) means on said output member for engaging said indexing means to position the output member in predetermined angular relation with respect to said indexing means, and
   (c) means for moving the engaging means into engagement with the indexing means following each rotary movement of said output member so as to cyclically correct angular position error in the output member.

4. The invention in accordance with claim 3 and wherein:
   (a) said indexing means comprises an indexing plate having a plurality of teeth formed therein, and
   (b) said engaging means comprises a tapered dog which bottoms between adjacent teeth on said indexing plate during engagement with the indexing plate.

5. The invention in accordance with claim 4 and wherein said indexing plate is coaxially disposed with respect to said output member.

6. The invention in accordance with claim 3 and wherein said moving means comprises a pivotally mounted shift arm, one end of which follows a cam surface formed on the input member and the other end of which is operatively associated with said output member to move the same relative to said indexing means.

7. The invention in accordance with claim 6 and wherein the ends of said shift arm are provided with rollers for contacting the cam surface and said output member respectively, and said device further comprises means for resiliently urging the shift arm toward engagement with said cam surface.

8. The invention in accordance with claim 1 and wherein said interconnecting means comprises:
   (a) a link operatively associated with said shaft for imparting rotary motion to the shaft, and
   (b) an adjustable crank arm mounted on said input member and connected to one end of said link,
   (c) said crank arm comprising means for adjusting distance between the axis of the input member and said end of said link to thereby control the amplitude of the oscillations of said shaft.

9. In a device having:
   (a) rotatable drive input means;
   (b) rotatable drive output means; and
   (c) means operatively associated with said drive input and output means for receiving continuous, unidirectional rotation from said drive input means and imparting an intermittent, unidirectional movement of substantially uniform, predetermined magnitude to said drive output means in response thereto; the improvement comprising:
   (d) means operatively associated with said drive output means for cyclically correcting any error in the previous predetermined intermittent movement imparted to said output means.

References Cited

UNITED STATES PATENTS

| | | | |
|---|---|---|---|
| 771,928 | 10/1904 | Persson | 74—600 |
| 919,006 | 4/1909 | Hancock | 74—125.5 |
| 1,476,766 | 12/1923 | Reynolds | 74—125.5 |
| 2,226,896 | 12/1940 | Cooper | 192—66 |

FRED C. MATTERN, JR., *Primary Examiner.*

W. S. RATLIFF, *Assistant Examiner.*